United States Patent [19]

Narita et al.

[11] Patent Number: 4,676,064

[45] Date of Patent: Jun. 30, 1987

[54] HEAT-INSULATED PORT LINER ARRANGEMENT AND METHOD OF FABRICATION

[75] Inventors: Yoshinori Narita; Takashi Kato, both of Aichi, Japan

[73] Assignee: NGK Spark Plug Co., Ltd., Japan

[21] Appl. No.: 858,873

[22] Filed: May 1, 1986

Related U.S. Application Data

[63] Continuation of Ser. No. 726,644, Apr. 24, 1985, abandoned.

[30] Foreign Application Priority Data

Apr. 24, 1984 [JP] Japan ........................ 59-60289[U]

[51] Int. Cl.4 ........................ B23P 15/00; B23P 17/00; B22D 19/00; F01N 7/00

[52] U.S. Cl. ........................ 60/272; 29/156.4 WL; 29/527.6; 29/DIG. 5; 123/193 H; 164/98

[58] Field of Search ............... 29/156.4 R, 156.4 WL, 29/527.2, 527.3, 527.5, 527.6, DIG. 5; 60/272, 273, 282; 123/193 H; 164/97, 98, 107, 122

[56] References Cited

U.S. PATENT DOCUMENTS

| | | | |
|---|---|---|---|
| 2,225,807 | 12/1940 | Towler | 60/282 |
| 3,919,755 | 11/1975 | Kaneko et al. | 29/156.4 WL |
| 4,167,207 | 9/1979 | Rao et al. | 29/156.4 WL |
| 4,207,660 | 6/1980 | Rao et al. | 29/156.4 WL |
| 4,604,779 | 8/1986 | Narita et al. | 29/156.4 WL |

FOREIGN PATENT DOCUMENTS

| | | | |
|---|---|---|---|
| 2354254 | 5/1974 | Fed. Rep. of Germany | 164/98 |
| 2404115 | 10/1974 | Fed. Rep. of Germany | 164/98 |
| 2602434 | 7/1977 | Fed. Rep. of Germany | 164/98 |
| 1398301 | 12/1965 | France | 164/98 |
| 2272966 | 12/1975 | France | 164/98 |

*Primary Examiner*—Howard N. Goldberg
*Assistant Examiner*—Ronald S. Wallace
*Attorney, Agent, or Firm*—Saidman, Sterne, Kessler & Goldstein

[57] ABSTRACT

A heat-insulated port liner arrangement for a device composed of a cast metal which is molded around the arrangement and includes a tubular port liner composed of a material including a ceramic, a first covering layer disposed on the outer surface of the liner and composed of a material including refractory fibers, and a second covering layer disposed on the outer surface of the first covering layer and composed of a material including a metal having a melting point not lower than the melting point of the cast metal.

5 Claims, 3 Drawing Figures

HEAT-INSULATED PORT LINER ARRANGEMENT AND METHOD OF FABRICATION

This application is a continuation of application Ser. No. 726,644, filed Apr. 24, 1985, now abandoned.

BACKGROUND OF THE INVENTION

1. Field of the Invention

The present invention relates to a heat-insulated port liner arrangement which is used to prevent a decrease in temperature of an exhaust gas in an internal combustion engine.

2. Description of the Related Art

Japanese Utility Model Application (OPI) No. 82455/83 discloses an arrangement for preventing the temperature of exhaust gas from decreasing in an internal combustion engine. Such an arrangement uses a cylinder head with exhaust ports made of ceramics. This facilitates the cleaning of the exhaust ports and provides them with improved heat insulation properties.

The exhaust port of a cylinder head for an internal combustion engine is formed by producing a ceramic port liner, covering it with ceramic fibers, and then casting the cylinder head body from molten metal around the port liner assembly. In casting the cylinder head around the port liner arrangement, the heat insulation properties of the port liner arrangement cause cooling of the molten metal to be retarded in the area around the port liner arrangement. This retarded cooling causes blowholes to form in the neighborhood of the port liner arrangement. Such blowholes decrease sealability and allow leakage of gases from the combustion chamber and leakage of cooling water from the cooling system. It also has been found that poor wetting properties of the refractory fibers in their interface with the casting metal is also responsible for the formation of blowholes.

It is an object of the present invention to provide a heat insulated port liner arrangement which, when casting a cylinder head around the port liner arrangement, does not cause cooling of the molten metal to be substantially retarded in the area around the port liner arrangement.

It is another object of the present invention to provide a heat insulated port liner arrangement which does not cause blowholes to form in the neighborhood of the port liner arrangement when a cylinder head is cast around the port liner arrangement.

It is still a further object of the present invention to provide a heat insulated port liner arrangement in which sealability is not decreased and leakage of gases from the combustion chamber and leakage of cooling water from the cooling system does not occur.

It is still an additional object of the present invention to provide a heat insulated port liner arrangement having good wetting properties on its interface with the metal of the cylinder head.

Additional objects and advantages of the invention will be set forth in the description which follows, and in part will be obvious from the description, or may be learned by the practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purposes of the invention as embodied and broadly described herein, a heat insulated port liner arrangement for a device composed of a cast metal which is molded around the arrangement is provided comprising a tubular port liner composed of a material having high thermal resistance and having a radially outward surface; and a covering layer disposed on the radially outward surface of the liner, the covering layer composed of a material including a metal having a melting point not lower than the melting point of the cast material.

It is preferable that the heat insulated port liner arrangement comprises a tubular port liner, the liner composed of a material including a ceramic and having a radially outward surface; a first covering layer, the first covering layer disposed on the radially outward surface of the liner and composed of a material including refractory fibers, the first covering layer having a radially outward surface; and a second covering layer, the second covering layer disposed on the radially outward surface of the first covering layer and composed of a material including a metal having a melting point not lower than the melting point of the cast metal.

There are three preferred embodiments for covering the outer surface of the first covering layer. The first includes placing the liner and first covering layer in a mold and pouring molten metal between the mold surface and the first covering layer to form the second covering layer. The second preferred method includes dipping the liner and first covering layer in a molten metal to form the second covering layer. The third preferred embodiment includes molding the second covering layer apart from the first covering layer with an inside surface having a shape similar to the shape of the outside surface of the first covering layer; and assembling the second covering layer to overlie the first covering layer.

BRIEF DESCRIPTION OF THE DRAWINGS

The accompanying drawings, which are incorporated in and constitute a part of the specification, illustrate preferred embodiments of the invention and, together with a general description of the invention given above and the Detailed Description of the Preferred Embodiments given below, serve to explain the principles of the invention.

DESCRIPTION OF THE PREFERRED EMBODIMENT

Reference will now be made in detail of the present preferred embodiment of the invention as illustrated in the accompanying drawings.

EXAMPLE 1

Figure 1:
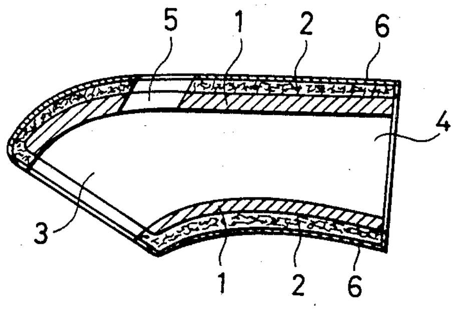
FIG. 1 is a cross-sectional view of a heat insulated port liner arrangement incorporating the teachings of the present invention.

An exhaust port liner 1 was produced using a sintered body of aluminum titanate. This exhaust port liner 1 had an inner diameter of 30 mm, a thickness of 1.5 mm, a length of 100 mm, a bent top portion, and a cross-sectional shape as shown in FIG. 1.

Refractory fibers made mainly of alumina were mixed with an alumina sol as an inorganic binder to prepare a suspension, and this suspension was coated on the outer surface of the exhaust port liner 1 in a thickness of 3 mm and dried. Then, a flux was coated on the above-formed coating to form a first covering layer 2. In order to prevent the entrance of a molten metal into the inside of the port liner, openings 3, 4, 5 were closed with caps.

Figure 2:
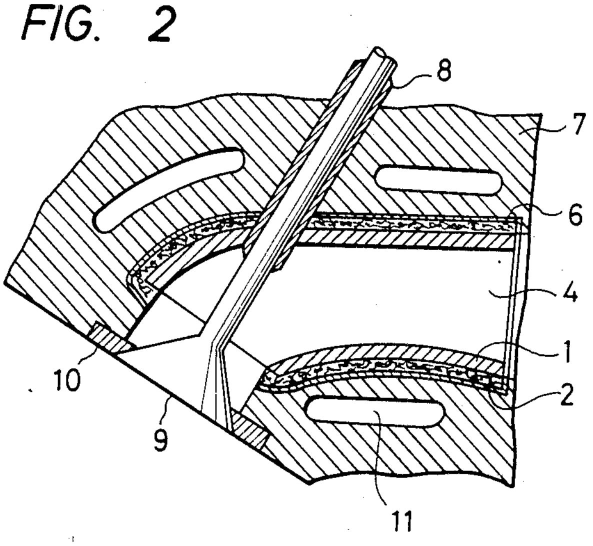
FIG. 2 is a cross-sectional view of a heat insulated port liner arrangement incorporating the teachings of the present invention and shown located within a cylinder head.

Subsequently, the arrangement of exhaust port liner 1 with the first covering layer 2 was dipped in aluminum melted at 800° C. to form an outer aluminum layer. This is shown as second covering layer 6, having a thickness of 0.5 mm. The resulting assembly was placed in a mold for a cylinder head (not shown), and an aluminum material was poured into the mold to produce a cylinder head 7. In the cylinder head formed in this manner, blowholes were not formed and sealability was good. A cross-sectional view of the boundary of the port liner arrangement is shown in FIG. 2. The cylinder head arrangement also includes conventional features including a valve stem guide 8, an exhaust valve 9, a valve sheet 10, a hole 11 through which a cooling water passes, openings 3 and 4 at the ends of the exhaust port and opening 5 for the valve stem guide 8.

EXAMPLE 2

A port liner with a first covering layer was produced in the same manner as described in Example 1. This arrangement was used as a core and placed in a mold having a shape similar to the exhaust port liner. Then, aluminum was poured into the mold to form a 2 mm thick aluminum covering layer on the outer surface of the first covering layer. The resulting assembly was cast in a cylinder head in the same manner as in Example 1. Blowholes were not formed and sealability was good.

EXAMPLE 3

Figure 3:
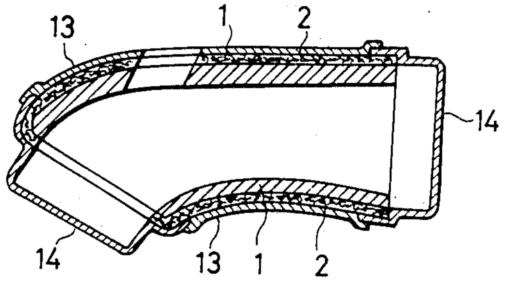
FIG. 3 is a cross-sectional view of another embodiment of a heat insulated port liner arrangement incorporating the teachings of the present invention.

A port liner with a first covering layer was produced in the same manner as described in Example 1. A 0.5 mm thick aluminum plate 13 which had been molded in a similar shape to the external shape of the first covering layer was fitted onto the first covering layer to produce an article having the cross-section shown in FIG. 3. Opening ends of the port liner were plugged with caps 14—14, the port liner arrangement was set, and a cylinder head was cast in the same manner as in Example 1. Blowholes were not formed and sealability was good.

COMPARATIVE EXAMPLE

A port liner with a first covering layer was produced in the same manner as described in Example 1. The arrangement was not provided with a layer of metal such as the second covering layer. The port liner arrangement was cast in a cylinder head in the manner described in Example 1. When cooling water was passed through the cylinder head, it leaked. When the cylinder head was dismantled and examined, it was found that blowholes were formed in the cast portion in contact with the refractory fibers.

The ceramic port liner is subject to a rapid heating-cooling cycle. Thus, in the production of the ceramic port liner, it has been found preferable to use compounds having a low coefficient of thermal expansion and high thermal resistance. These compounds include aluminum titanate, silicon nitride, silicon carbide, mullite, and corlierite. Refractory fibers used in the first covering layer are chosen for properties including heat resistance and strength. Such fibers include aluninum-mullitesilicon carbide-, and zirconia-based fibers. Of course, the present invention is not limited to the above compounds alone.

It is necessary for the metal of the second covering layer of the heat insulated port liner arrangement to have a melting point which is not lower, and is preferably higher than that of the metal for use in casting the cylinder head around the heat insulated port liner arrangement. For example, aluminum and iron base alloys can be used for this purpose.

As compared to known arrangements, the disclosed invention allows accelerated cooling of the molten metal. Wetting of the port liner with the molten metal is improved. Blowholes are not formed around the port liner.

In known arrangements, the dimensional accuracy of the outer diameter of the first covering layer is poor. In addition, the accuracy in positioning the mold is poor. Thus the first covering layer is difficult to cast precisely. On the other hand, in the present invention, working accuracy is increased since the outer surface is made of a metal.

Since the surface of the present invention is made of a metal, the second covering layer does not break down as easily during handling as compared with refractory fibers. In addition, the stress exerted on the port liner arrangement of the present invention during casting of the cylinder head is reduced and cracking of the ceramics is prevented.

Additional advantages and modifications will readily occur to those skilled in the art. The invention in its broader aspects is, therefore, not limited to the specific details, representative apparatus and illustrative examples shown and described. Accordingly, departures may be made from such details without departing from the spirit or scope of applicant's general inventive concepts.

What is claimed is:

1. A multi layered heat-insulated port liner for a device composed of a cast metal which is molded around the port liner comprising:
   - a tubular port liner, said liner composed of a material including a ceramic and having a radially outwardly extending surface;
   - a first covering layer, said first covering layer disposed on the radially outwardly extending surface of the liner and composed of a material including refractory fibers, said first covering layer having a radially outwardly extending surface; and
   - a second covering layer, said second covering layer disposed on the radially outwardly extending surface of the first covering layer and composed of a material including a metal having a melting point not lower than the melting point of the cast metal.

2. A method for making a multi-layered heat-insulated port liner for a device composed of a cast metal comprising:
   - forming a tubular port liner composed of a material including a ceramic;

covering the outer surface of the liner with a first covering composed of a material including refractory fibers;

covering the outer surface of the first covering layer with a second covering layer composed of a material including a metal having a melting point not lower than the melting point of the cast metal.

3. A method as claimed in claim 2 wherein the step of covering the outer surface of the first covering layer further includes:

placing the liner and first covering layer in a mold and pouring molten metal between the mold surface and the first covering layer to form the second covering layer.

4. A method as claimed in claim 2 wherein the step of covering the outer surface of the first covering layer further includes:

dipping the liner and first covering layer in molten metal to form the second covering layer.

5. A method as claimed in claim 2 wherein the steps of covering the outer surface of the first covering layer further include:

molding the second covering layer apart from the first covering layer so that the second covering layer is provided with an inside surface having a shape similar to the shape of the outside surface of the first covering layer; and assembling the second covering layer to overlie the first covering layer.

* * * * *